United States Patent
Hetteen

[15] 3,653,455
[45] Apr. 4, 1972

[54] OFF-ROAD VEHICLE WHEEL SUSPENSION

[72] Inventor: Allan E. Hetteen, Route #3, Roseau, Minn. 56751

[22] Filed: Aug. 1, 1969

[21] Appl. No.: 846,689

[52] U.S. Cl. ..............................180/85, 115/1 R, 152/384, 180/14 R, 180/23, 180/51, 280/80 R, 280/104.5 R
[51] Int. Cl. ............................................................B62d 53/00
[58] Field of Search ....................180/22, 23, 74, 85; 280/80, 280/81, 104.5, 104.5 A; 152/379, 384

[56] References Cited

UNITED STATES PATENTS

| | | | |
|---|---|---|---|
| 1,388,405 | 8/1921 | Clapp | 180/22 UX |
| 1,618,129 | 2/1927 | Overmann | 152/379 X |
| 1,627,225 | 5/1927 | Babel et al. | 180/22 |
| 2,025,793 | 12/1935 | Tschappat | 180/22 X |
| 2,083,766 | 6/1937 | Wittkopp | 152/379 |
| 2,172,173 | 9/1939 | Peterman | 280/104.5 |
| 2,713,373 | 7/1955 | Daugherty | 152/384 |
| 2,906,358 | 9/1959 | Tucker, Sr. | 180/23 |

FOREIGN PATENTS OR APPLICATIONS

| 731,883 | 2/1943 | Germany | 280/104.5 |
|---|---|---|---|

Primary Examiner—A. Harry Levy
Attorney—Merchant & Gould

[57] ABSTRACT

An articulated off-road vehicle is shown, having a front body portion and a rear body portion, connected for pivotal movements relative to each other about a substantially vertical axis, and for twisting movements relative to each other about a longitudinally extending, substantially horizontal axis. A drive shaft powered by an engine extends through the connections between the body portions, and is provided with a universal joint to accommodate the pivotal movement. An axle is mounted on each body portion and a differential for each axle is driven by the drive shaft. A wheel assembly, mounted on each end of each axle, has first and second wheel support arms each journaled at an upper end thereof on the axle, with the first arm extending forwardly and downwardly therefrom, and the second arm extending rearwardly and downwardly therefrom. A wheel is rotatably mounted on the lower end of each arm and a drive chain extends from the axle to each wheel for driving the wheel. A spring is connected between the arms intermediate the ends thereof to exert a force tending to draw the arms and attached wheels together.

2 Claims, 6 Drawing Figures

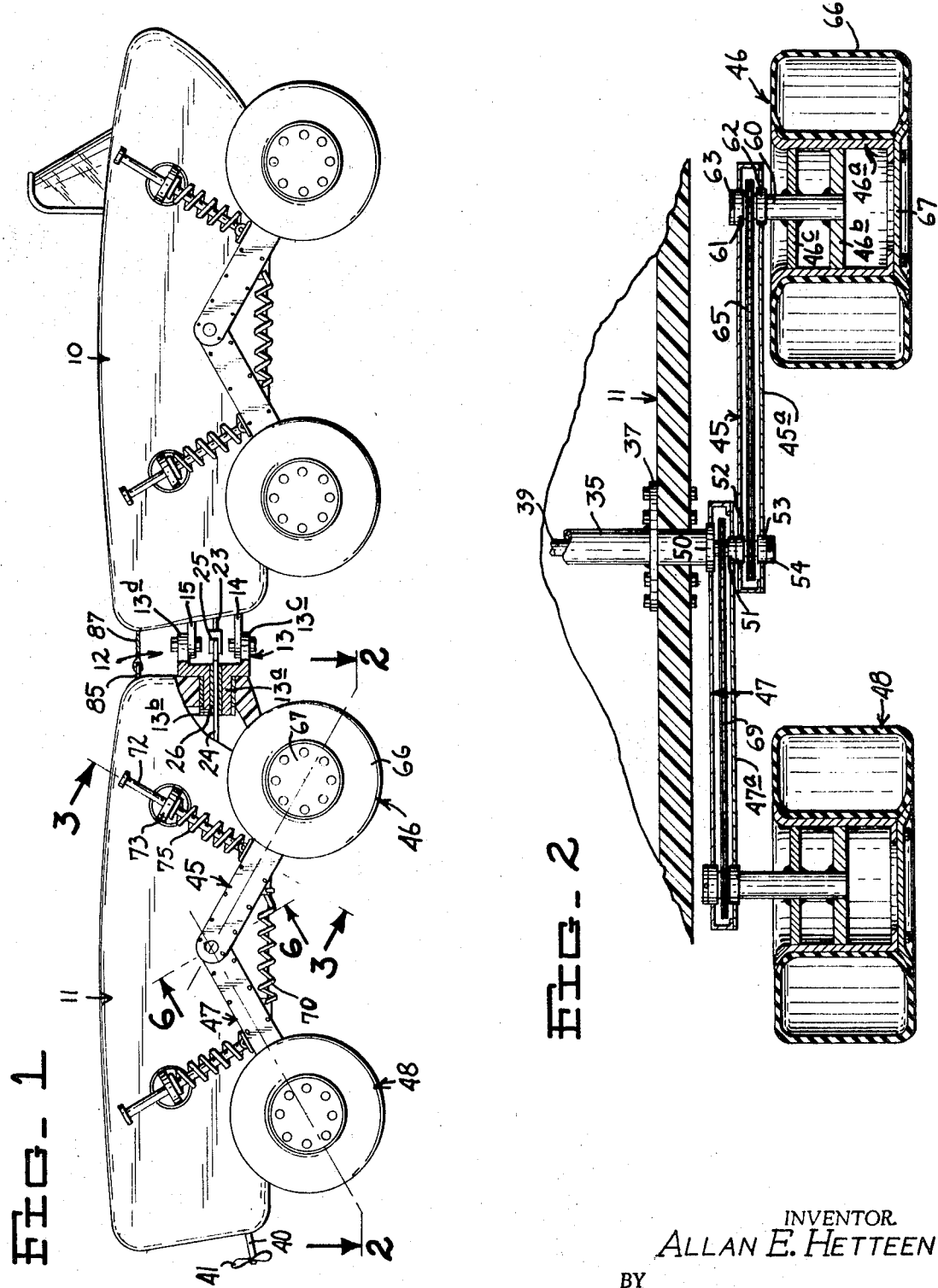

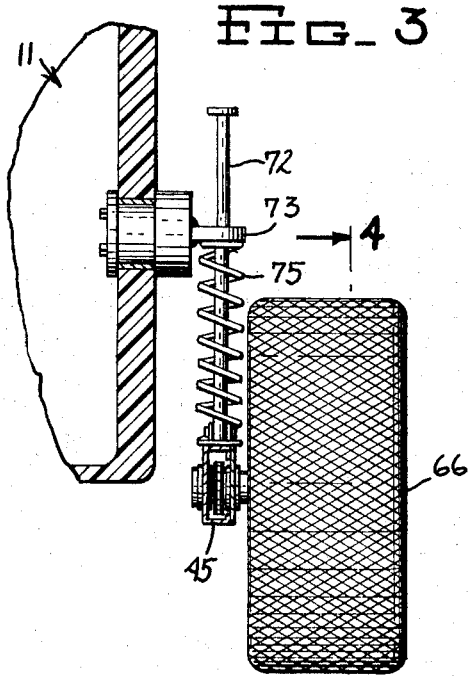
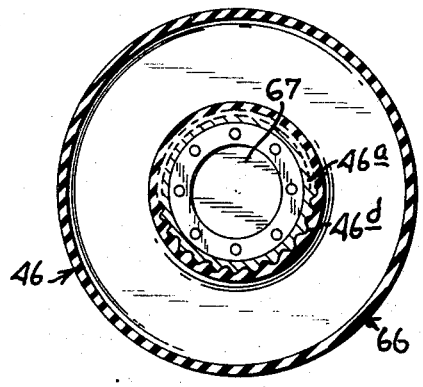
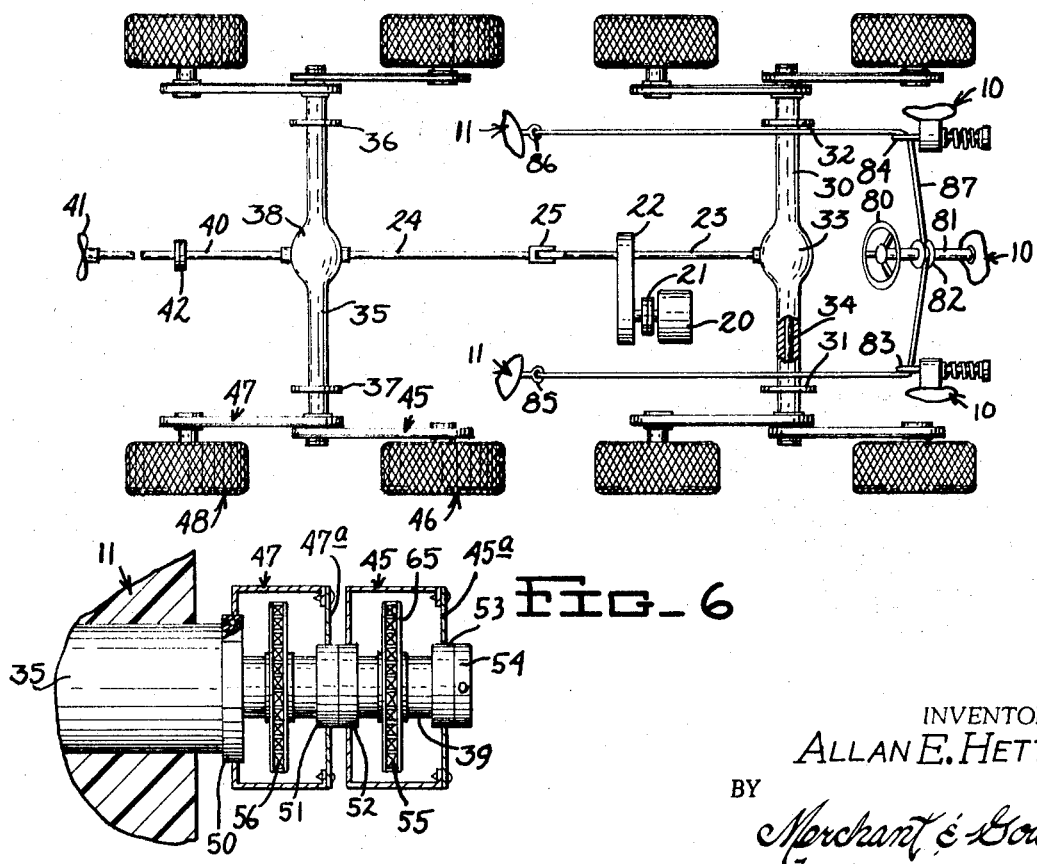
INVENTOR.
ALLAN E. HETTEEN
BY
Merchant & Gould
ATTORNEYS

OFF-ROAD VEHICLE WHEEL SUSPENSION

FIELD OF THE INVENTION

This invention relates generally to multi-terrain vehicles and more particularly relates to an improved suspension and drive system for such vehicles.

BACKGROUND OF THE INVENTION

Description of the Prior Art

In recent years, off-road vehicles have become popular with diverse groups of people. Various types of vehicles have been designed to accommodate this need, all of them being capable of operating with some degree of efficiency in off-road areas. The four-wheel drive Jeep has been popular with sportsmen because it is capable of operating at relatively high speeds over improved roads but can be taken into areas that would be impassable for an ordinary automobile. Such a vehicle will not, however, navigate swamps or climb over obstructions such as fallen trees. Therefore, its use in off-road areas is quite limited.

More sophisticated vehicles have been developed for off-road operation. For example, the Scott U.S. Pat. No. 3,360,067 discloses a four-wheel drive articulated vehicle. The basic advantages of four-wheel drive are retained and, in addition, the articulation between the front and rear portions of the vehicle permits it to navigate over and around obstacles that would tip or stop an ordinary four-wheel drive vehicle. While the Scott vehicle may operate reasonably well over hard ground, it would not be capable of operating in swampy or water filled areas.

Vehicles have been developed, however, that are capable of operating over both rough terrain and water. For example, the Gower-Rempel U.S. Pat. No. 3,180,305 discloses a relatively light vehicle having a unitary water-proof body and a plurality of low-profile tires for propelling the vehicle over the ground. The fact that all of the wheels are driving wheels permits operation over rough terrain. The fact that the vehicle is relatively light and is supported by low-profile tires permits it to be used over wet and swampy areas. A separate propulsion system is provided for propelling the vehicle through the water. A vehicle such as this is extremely rough riding, however, because there are no springs between the wheels and the body. The low pressure tires themselves provide the only shock absorbing function.

The basic requirements for an off-road vehicle can thus be recognized to some degree in the prior art. For example, it is known that all of the vehicle wheels should be driving wheels so that traction is obtained whenever a wheel is in contact with the ground. The vehicle should be articulated so that it can more readily pass over serious obstructions while maintaining all or most of the driving wheels in contact with the ground. The vehicle body should be light and water-tight so that the vehicle can navigate over swamps and lakes. As with any vehicle, some form of soft suspension is desirable to make the ride more comfortable. The advantages of low-profile tires are also well known. This is not meant to be an exhaustive list, but it does point up some of the features that were recognized as being important by prior designers.

SUMMARY OF THE INVENTION

The vehicle of my invention incorporates all of the features that I believe are necessary for successful multi-terrain operation. It is an articulated vehicle having a pair of relatively light, water-tight body portions, preferably made from molded plastic, that will withstand shocks and resist leakage. All of the wheels are driving wheels and a separate water propulsion system is provided. Wide, low-profile tires are used to improve traction and floatation. Most importantly, however, I have developed a new suspension system that improves both performance and comfort.

In particular, each body portion is provided with a drive axle that extends from the opposite sides thereof. A wheel assembly is mounted on each end of each axle. Each wheel assembly includes first and second arms each journalled at an upper end thereof on the axle. The first arm extends forwardly and downwardly therefrom and the second arm extends rearwardly and downwardly therefrom. A wheel is rotatably mounted on the lower end of each arm. A drive chain extends from the axle to each wheel to drive the wheel. A spring is connected between the arms intermediate the ends thereof the exert a force tending to draw the arms and attached wheels together. Further spring means are mounted between each arm and the body portion to limit and damp the arm movements.

With this suspension system, all eight wheels are driving wheels so that at all times, regardless of terrain, at least some of the wheels will be in contact with the ground. Each arm can pivot about the axle, but its movement is limited and damped by the springs. Each wheel can pivot upwardly to pass over obstructions without causing a corresponding amount of upward movement of the body portion. As one wheel of a pair passes over an obstruction, it tends to pull the other wheel of the pair downwardly into tighter engagement with the ground, because of the spring connection between them. Therefore, greater traction is obtained just when it is needed.

Because of its unique construction, the vehicle of my invention will travel at relatively high speeds over obstructions that would completely stop or seriously slow down other off-road vehicles. At the same time, however, a relatively soft ride is provided because of the unique suspension system. A more detailed description of the structure and resultant improved function of my vehicle will be given in the following specification.

BRIEF DESCRIPTION OF THE DRAWINGS

FIG. 1 is a view in side elevation of an articulated off-road vehicle according to my invention, a portion thereof being broken away;

FIG. 2 is an enlarged sectional view taken along line 2—2 of FIG. 1;

FIG. 3 is an enlarged sectional view taken along line 3—3 of FIG. 1;

FIG. 4 is a sectional view of a wheel and tire taken along line 4—4 of FIG. 3;

FIG. 5 is a somewhat schematic top plan view of the vehicle, portions thereof being broken away; and FIG. 6 is an enlarged sectional view taken along line 6—6 of FIG. 1.

DESCRIPTION OF THE PREFERRED EMBODIMENT

The drawings disclose an articulated vehicle having a front body portion 10 and a rear body portion 11, both of which are preferably molded from a plastic material that will withstand shocks. Body portions 10 and 11 are both water-tight so that the vehicle can be used to traverse lakes and streams. Each body portion has an opening in the top thereof so that each can carry passengers and equipment. The two body portions 10 and 11 are connected by a hinge assembly 12 for pivotal movements relative to each other about a substantially vertical axis, and for twisting movements relative to each other about a longitudinally extending, substantially horizontal axis. Hinge assembly 12 includes a clevis member 13 having a tubular rear end 13a rotatably mounted in a correspondingly sized opening in the front wall of rear body portion 11. Tubular rear end 13a is provided with an end flange 13b adjacent the inner wall of rear body portion 11 to prevent forward movements of clevis member 13b with respect to rear body portion 11. Clevis member 13 also includes a pair of vertically spaced, forwardly extending arms 13c and 13d, portions of which engage the flat front wall of rear body portion 11 to prevent rearward movements of clevis member 13 with respect to body portion 11. Securely mounted to the rear wall of front body portion 10 are a pair of vertically spaced, rearwardly extending arms 14 and 15, also forming a part of hinge assembly 12. Suitable openings are formed in the ends of these arms in which a pair of hinge pins are mounted. Arms 13d and 15, and arms 13c and 14, are connected by the pair of hinge pins as shown. The two body portions can thus pivot with respect to each other about a substantially vertical axis extending through the two hinge pins. Rear body portion 11 can also twist with respect to front body portion 10 about the tubular rear end 13a of clevis member 13.

As shown schematically in FIG. 5 an engine 20 is mounted in front body portion 10 to which is attached a clutch assembly 21 and a transmission 22. The usual control linkages would be required, but are not shown on the drawings. Transmission 22 drives a front drive shaft 23 that extends along the center line of the vehicle, through the rear end of front body portion 10. A rear drive shaft 24 is mounted in rear body portion 11. Drive shafts 23 and 24 are connected between the two body portions by a universal joint 25 that accommodates the pivotal movements previously described. Rear drive shaft 24 extends through the center opening of tubular rear end 13a, with suitable packing 26 being provided between the two members to prevent water leakage therebetween. Similar sealing is provided around front drive shaft 23 where it passes through the rear wall of front body portion 10.

A transversely extending front axle housing 30 is mounted in front body portion 10 with the opposite ends thereof extending through the opposite side walls of body portion 10. A pair of spaced flanges 31 and 32 are welded to axle housing 30, and the flanges are bolted to the inner side walls of body portion 10 to prevent relative movement between the axle housing and body portion. Mounted at the center of front axle housing 30 is a differential assembly 33 that is connected to the front end of front drive shaft 23. Front axle housing 30 also carries a pair of axle shafts that extend outwardly in opposite directions from differential assembly 33. One of these axle shafts, identified by the numeral 34, is shown in FIG. 5. Suitable bearings are provided between the axle shafts and the axle housing 30 to permit rotation of the axle shafts in the usual manner.

A rear axle housing 35 is mounted in rear body portion 11 and extends through the opposite side walls thereof. A pair of spaced flanges 36 and 37 are welded to axle housing 35, and are bolted to the inner walls of rear body portion 11, as shown in more detail in FIG. 2. Rear axle housing 35 also carries a differential assembly 38, that is operatively connected to the rear end of rear drive shaft 24. A pair of axle shafts extend outwardly in opposite directions from differential assembly 38 through rear axle housing 35, as previously described for the front body portion. One of these axle shafts, identified by the numeral 39, is shown in more detail in FIG. 6. Extending rearwardly from differential assembly 38, through the rear wall of rear body portion 11, is another drive shaft 40, having a propeller 41 attached to the rear end thereof. A clutch assembly 42, shown schematically in FIG. 5, is mounted in drive shaft 40 to permit selective activation thereof. Again, a suitable seal is provided between drive shaft 40 and the opening through the rear wall of body portion 11 to prevent water leakage therethrough. When clutch assembly 42 is engaged, propeller 41 is rotated to propel the vehicle through the water.

Thus, when engine 20 is running and clutch assembly 21 is engaged, transmission 22 causes rotation in a selected direction of front drive shaft 23, which in turn causes rotation or rear drive shaft 24 by means of universal joint 25. The drive shafts in turn operate the two differential assemblies 33 and 38 to rotate the axle shafts in the usual manner.

Although the front and rear axle housings 30 and 35 each have a differential driving a pair of oppositely extending axle shafts, we will assume for the purpose of discussing the suspension system that the two axle shafts in each housing form a single axle. Thus, front body portion 10 will be considered to have a single axle, the ends of which extend from the opposite ends of axle housing 30. In like manner, axle housing 35 will be considered to carry a single axle.

FIG. 5 shows that a wheel assembly is mounted on each end of each axle. As each wheel assembly is constructed in the same manner, a description of one assembly will suffice.

Refering now to FIG. 2, rear axle housing 35 is shown as extending through the side wall of rear body portion 11 a short distance beyond the outside surface of the wall. Axle 39 extends through axle housing 35 and terminates a predetermined distance beyond the end thereof. Journalled at an upper end thereof on the end of axle 39 is a first wheel support arm 45 that extends forwardly and downwardly therefrom. A wheel 46 is rotatably mounted on the lower end of arm 45. Also journalled at an upper end thereof on the end of axle housing 35 and axle 39 is a second wheel support arm 47 that extends rearwardly and downwardly therefrom. A wheel 48 is rotatably mounted on the lower end of arm 47. The manner in which arms 45 and 47 are journalled on housing 35 and axle 39 is shown more fully in FIG. 6. As shown in FIG. 6, the two arms 45 and 47 are constructed from a channel member having a U-shaped cross section. The open faces of each of the arms 45 and 47 are provided with cover plates 45a and 47a, respectively, that extend the full length thereof. The edges of the side walls of the arms 45 and 47 are provided with inwardly turned flanges to which the cover plates 45a and 47a are attached with suitable screws as shown in FIG. 6. The cover plates 45a and 47a serve a dual function. First, they keep dirt out of the drive chains and second, they aid in supporting the arms 45 and 47.

Arm 47 is journalled on housing 35 and axle 39 as follows. A bearing assembly 50 is mounted on a reduced diameter end portion of axle housing 35. The inner race of bearing assembly 50 is thus supported by the reduced diameter end portion of housing 35. The outer race is welded or otherwise securely attached to a correspondingly sized circular opening in the side wall of wheel support arm 47. Another, smaller diameter bearing assembly 51 is mounted on axle 39 and is secured within a correspondingly sized opening in cover plate 47a. In like manner, arm 45 and cover plate 45a are supported on axle 39 by means of a pair of bearings 52 and 53. To hold these units securely on axle 39, a metal ring 54 is inserted over the end of axle 39 and a pin is inserted through corresponding openings in it and the end of axle 39. The two arms 45 and 47, and the bearings on which they are mounted, are thus locked between the end of axle housing 35 and ring 54. In this way, axial movements of the arms 45 and 47 along axle 39 is prevented. At the same time, because the opposite side walls of both of the arms 45 and 47 are separately supported by bearings, no twisting of the arms can occur with respect to the axle. However, both of the arms 45 and 47 are free to rotate with respect to the axle 39 and housing 35, whether the axle is being driven by the engine or not.

A pair of sprocket gears 55 and 56 are mounted on axle 39 within the confines of arms 45 and 47 respectively. Each of the sprocket wheels 55 and 56 is provided with a mounting flange for securing it to axle 39 as shown. If desired, a spline connection between the axle and sprocket wheels could be used to prevent rotation therebetween.

As previously mentioned, wheel 46 is journalled for rotation on the lower end of arm 45. Wheel 46 includes a drum-like rim 46a that is circular in cross section. A pair of circular disc members 46b and 46c, each having a circular opening, are welded at spaced apart positions to the inner surface of rim 46a. A shaft 60 extends through the openings in the two disc members 46b and 46c and is welded to each. One end of shaft 60 terminates at approximately the center line of the wheel. The other end of shaft 60 extends a predetermined distance out from the end of rim 46a. A pair of spaced bearing assemblies 61 and 62 are mounted on shaft 60 and are secured to corresponding openings in arm 45 and cover plate 45a. Preferably, the two bearing assemblies 61 and 62 are mounted on a reduced diameter portion of shaft 60, and a locking ring 63 is provided to retain the assembly in place. The two bearing assemblies 61 and 62 together with the arm 45 and cover plate 45a mounted thereon, are locked between the large diameter portion of shaft 60 and the locking ring 63. Mounted on shaft 60 between the two bearing assemblies is a sprocket wheel. A drive chain 65 is mounted over this sprocket wheel and sprocket wheel 55. Thus, rotation of axle 39 causes a like rotation of shaft 60 by means of the two sprocket wheels and drive chain.

Wheel 46 further includes a low-profile rubber tire 66 mounted on rim 46a. As best shown in FIG. 2, the inner diameter of the tire 66 corresponds generally to the outer diameter of rim 46a. The inner end of rim 46a is provided with an up-turned flange to aid in holding the tire on the rim. After the tire is inserted over the rim, it is locked in place by a circular locking plate 67 that is bolted to suitable in-turned flanges on the outer end of rim 46a. Locking plate 67 is of larger diameter than rim 46a so that tire 66 is held securely between its outer periphery and the previously mentioned flange on the end of rim 46a. As previously mentioned, tire 66 is preferably a large, low-pressure tire to provide a large amount of surface area in contact with the ground. If desired, the outer periphery of the tire can carry treads to increase traction. Preferably, as shown in FIG. 4, the outer surface of rim 46a is provided with a plurality of convolutions 46d that extend between the ends thereof. When tire 66 is inflated, the inner surface thereof will conform to some degree with the convolutions 46d, to prevent the tire from slipping with respect to the rim under ordinary drive conditions. However, if unusually heavy traction conditions are encountered, this arrangement permits the tire to slip with respect to the rim. This small amount of slippage tends to reduce shocks being transmitted to the vehicle body and thus improves the riding characteristics of the vehicle. The slippage is not sufficient to affect performance.

The other tire 48 is constructed in identical fashion and is mounted on the lower end of wheel support arm 47 in the same way. It is also driven by a suitable drive chain 69 that engages drive sprocket 56. Thus, when axle 39 is rotated in one direction, wheels 46 and 48 rotate in the same direction.

As best shown in FIG. 1, a relatively heavy coil spring 70 is connected between arms 45 and 47 intermediate the ends thereof. Spring 70 is constructed to exert a force tending to draw arms 45 and 47 together. Because the wheels 46 and 48 are resting on the ground, this force tends to pull both wheels down into engagement with the ground, rather than permit the load to be carried by a single wheel.

Additional limiting and damping means are also provided for the two arms of the wheel assembly. As best shown in FIG. 3, a long bolt 72 is pivotally mounted to the top surface of support arm 45 intermediate the ends thereof. Bolt 72 extends upwardly from arm 45 through an opening in a wheel stop member 73. Wheel stop member 73 is secured to the side wall of rear body portion 11 by means permitting at least limited rotation thereof about a horizontal axis. A large diameter head is formed on the top end of bolt 72 to prevent it from being drawn downwardly through the opening in wheel stop member 73. Mounted between stop member 73 and arm 45, surrounding bolt 72, is a coil spring 75. Bolt 72 holds spring 75 in place and also prevents arm 45 from swinging downwardly away from stop member 73 too far. Stop member 73 and spring 75 will of course limit upward movements of arm 45. This unit thus tends to limit and damp the movements of arm 45 and wheel 46. As shown in FIG. 1, an identical unit is mounted between arm 47 and body portion 11 to accomplish the same function.

With this system, if front wheel 46 encounters an obstacle such as a rock, it can pivot upwardly on arm 45 about axle 39 without interfering with any of the other wheels on the vehicle. Wheel 48 will maintain its contact with the ground and will in fact provide greater traction because spring 70 is stretched as wheel 46 rises over the obstacle. This stretching or tensioning of spring 70 will actually force wheel 48 into tighter contact with the ground. As front wheel 46 passes over the obstacle, it returns downwardly under the influence of spring 70 and spring 75, and shortly thereafter, wheel 48 encounters the obstacle and swings upwardly and rearwardly on arm 47 about axle 39. Again, as wheel 48 rises to pass over the obstacle, spring 70 is stretched to pull front wheel 46 downwardly into tighter engagement with the ground. During this operation, body portion 11 will be raised a certain amount as the obstacle is passed over, but most of the heighth of the obstacle is absorbed by the swinging movements of the wheels. In the case of relatively small obstacles, the wheels and wheel support arms may absorb the entire height of the obstacle so that the body portion will maintain a relatively level path over the ground. With respect to larger obstacles, a major portion of the obstacle heighth will be absorbed in the suspension system, so that less up and down movement is transmitted to the vehicle. Although only one of the four wheel assemblies has been described in detail, it is evident that all of them will operate in the same fashion to improve performance and comfort. Because of my improved suspension system, this vehicle will walk over large obstacles at reasonably high speeds without seriously disturbing the occupants of the vehicle. Further, the vehicle will easily traverse swampy areas because of the large amount of tire surface in contact with the ground. Maximum traction is always achieved because all eight wheels are driving wheels. Although my improved wheel assembly has been shown in combination with an articulated vehicle to achieve maximum performance, these wheel assemblies can also be used with a vehicle having a single body. In such event, the advantages of vehicle articulation will be lost, but such a vehicle will still out-perform the other off-road vehicles of which I am aware. The present invention thus provides a vehicle that will meet the needs of a wide variety of people at a relatively low cost.

The steering system for the vehicle operates as follows. A steering wheel 80 is mounted on a steering shaft 81 that is rotatably mounted on the inner front wall of front body portion 10. A cable drum 82 is mounted on shaft 81 intermediate the ends thereof. Secured to the inner side walls of front body portion 10, adjacent the front end thereof, are a pair of spring-loaded guide members 83 and 84. Secured to the front wall of rear body portion 11, on opposite sides thereof, are a pair of anchor members 85 and 86. Secured at its center to drum 82 is a steering cable 87. The opposite ends of steering cable 87 extend through guide members 83 and 84 and are secured to anchor members 85 and 86. Cable 87 is also wrapped around drum 82 sufficient times to permit the necessary movements thereof. It can be seen that when wheel 80 is turned in one direction, cable 87 will wind around drum 82 to shorten its effective length on one side of the drum and lengthen its effective length on the other side. One corner or the other of rear body portion 11 will thus be drawn closer to the corresponding corner of front body portion 10, causing the vehicle to turn.

What is claimed is:

1. In a vehicle having a driven axle, the improvement comprising a wheel assembly mounted on each end of said axle, each assembly comprising:
    a. first and second wheel support arms rotatably mounted with respect to said axle for rotation about a common transverse axis, said first arm extending forwardly and downwardly therefrom, said second arm extending rearwardly and downwardly therefrom;
    b. a wheel rotatably mounted on each of said arms;
    c. means extending from said axle to each said wheel for driving said wheel;
    d. spring means connected between said arms intermediate said axle and wheel of each and extending below said axle to exert a force tending to yieldingly pull said arms and attached wheels together below said axle; and
    e. resilient means positioned between each said arm and said vehicle to limit movement of said arms.

2. A suspension and drive unit for a vehicle having a drive axle and means for driving said axle, comprising:
    a. first and second support arms rotatably mounted at an upper end of each on said axle for rotation about a common transverse axis, said first arm extending forwardly and downwardly therefrom, said second arm extending rearwardly and downwardly therefrom;
    b. a wheel rotatably mounted on each arm;
    c. means extending from said axle to each said wheel for driving said wheel;

d. a spring connected between said arms for limiting and damping the movement of each of said arms; and
e. spring means connected between each said arm and said vehicle to aid in limiting and damping said arm movements.

* * * * *